United States Patent [19]
McFarland et al.

[11] Patent Number: 5,959,633
[45] Date of Patent: Sep. 28, 1999

[54] METHOD AND SYSTEM FOR PRODUCING GRAPHICAL IMAGES

[75] Inventors: Kevin E. McFarland, Coppell; Rodney T. Whisnant, Plano, both of Tex.

[73] Assignee: Micrografx, Inc., Richardson, Tex.

[21] Appl. No.: 08/726,091

[22] Filed: Oct. 4, 1996

[51] Int. Cl.[6] .................................................. G06F 15/00
[52] U.S. Cl. ........................................................ 345/441
[58] Field of Search .................................... 345/440, 441, 345/442, 443, 113, 114

[56] References Cited

U.S. PATENT DOCUMENTS

| | | |
|---|---|---|
| 5,790,117 | 8/1998 | Haviatti et al. .......................... 345/333 |
| 5,805,160 | 9/1998 | Yoshida et al. .......................... 345/339 |
| 5,812,131 | 9/1998 | Bertram .................................. 345/339 |

OTHER PUBLICATIONS

Developing Visio Solutions, Version 4, 1995, pp. 1–163.

*Primary Examiner*—Phu K. Nguyen
*Attorney, Agent, or Firm*—Baker & Botts, L.L.P.

[57] ABSTRACT

A method and system for producing graphical images includes a computer-readable medium and a computer program encoded on the computer-readable medium. The computer program is operable to access an external shape stored outside the computer program. The external shape comprises external capabilities. The computer program is further operable to delegate the production of a graphical image of the external shape to the external capabilities.

28 Claims, 5 Drawing Sheets

METHOD AND SYSTEM FOR PRODUCING GRAPHICAL IMAGES

TECHNICAL FIELD OF THE INVENTION

This invention relates generally to the field of computer graphics and more particularly to a method and system for producing graphical images.

BACKGROUND OF THE INVENTION

Systems for creating computer graphics are well known. Many computer graphics systems provide tools within a computer program that allow a user to draw and edit a variety of shapes. However, conventional systems only enable a user to draw and edit a limited number of shapes. If additional shapes are desired, the computer program in the system must be modified to include the additional tools needed to draw and edit the desired shape. Adding new tools to the computer program each time a new shape is desired is a lengthy and costly process. Furthermore, once a computer program is released, it becomes difficult to update the program with additional shapes.

In an effort to overcome these disadvantages, one computer graphics system incorporates a limited component plug-in capability utilizing tables. When a particular shape is desired, the system accesses a table of data files. The data files contain information describing a shape. The shape is then created and edited with tools within the computer program. Such a system is limited to editing and creating shapes in ways permitted by the tools within the computer program. Thus, although shapes may be added after release of the computer program, the shapes that may be added are limited to shapes that the internal tools in the computer program know how to create and edit.

SUMMARY OF THE INVENTION

Therefore, a need has arisen for a new method and system that overcomes the disadvantages and deficiencies of the prior art.

The invention includes a method and system for generating graphical images. According to one embodiment of the invention, a method for producing graphical images includes executing a computer program and providing a shape library external to the computer program. The shape library defines a shape having associated capabilities. The method further comprises providing the capabilities associated with the shape to the computer program while the application is executing and generating a graphical image based on the capabilities.

According to another embodiment of the invention a system for producing graphical images includes a computer-readable medium and a computer program encoded on the computer-readable medium. The computer program is operable to access an external shape stored outside the computer program. The external shape has external capabilities. The computer program is further operable to delegate the production of a graphical image of the external shape to the external capabilities.

The invention provides several technical advantages. New shapes may be added easily without rewriting the underlying computer program. Additionally, shapes may be developed by third parties, addressing particular markets. Furthermore, because shapes may be developed external to the computer program, they may be developed outside the application project schedule. Moreover, because shapes may be added easily, upgrades to the computer graphics package may be provided more frequently at lower cost. In addition, the invention provides for the modular production of additional shapes. Shapes may be grouped in different modules based on similarity of appearance or other characteristics, such as intended use. For example, shapes commonly used in a particular technical field may be grouped in one module. The invention also provides an architecture that allows for the integration of additional shapes with an existing computer program without modifying that existing program.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE INVENTION

An embodiment of the present invention and its advantages are best understood by referring to FIGS. 1 through 6 of the drawings, like numerals being used for like and corresponding parts of the various drawings.

Figure 1:
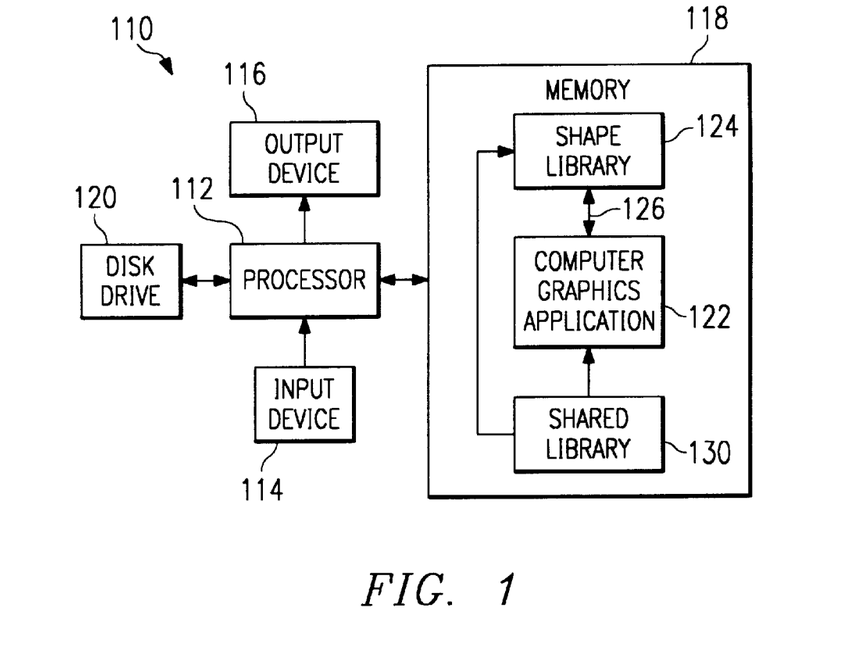
FIG. 1 illustrates a computer graphics system.

FIG. 1 shows a schematic diagram of a computer graphics system 110 according to one embodiment of the invention. Computer graphics system 110 comprises computer software running on a general purpose computer. Computer graphics system 110 comprises a processor 112, input device 114, output device 116, memory 118, and disk drive 120. The present invention comprises computer software that may be stored in memory 118 or on disk drive 120 and is executed by processor 112. Disk drive 120 may comprise a variety of types of storage media such as, for example, floppy disk drives, hard disk drives, CD ROM disk drives, or magnetic tape drives. Data may be received from the user of computer graphics system 110 using a keyboard or any other type of input device 114. Data may be output to a user of computer graphics system 110 through output device 116. Output device 116 may comprise a variety of types of output devices such as, for example, a computer display or a printer.

Computer graphics system 110 comprises computer graphics application 122, which is a computer software program for producing graphical images on output device 116. In FIG. 1, computer graphics application 122 is illustrated as being stored in memory 118 for execution by processor 112. Computer graphics application 122 may also be stored in disk drive 120. Computer graphics application 122 receives information from input device 114 and produces graphical images on output device 116. Computer graphics system 110 further comprises an external shape library 124. In FIG. 1, shape library 124 is illustrated as being stored in memory 118. Shape library 124 may also be stored in disk drive 120. Shape library 124 contains information used by computer graphics application 122 to produce graphical images on output device 116. Information in shape library 124 is communicated to computer graphics application 122 through communication link 126. The computer graphics system 110 further comprises a shared library 130. In FIG. 1, shared library 130 is illustrated as being stored in memory 118. However, as discussed in greater detail below, shared library 130 may also be stored in disk drive 120. Shared library 130 provides a group of utility functions that may be used by either computer graphics system 110 or shape library 124.

Figure 2:
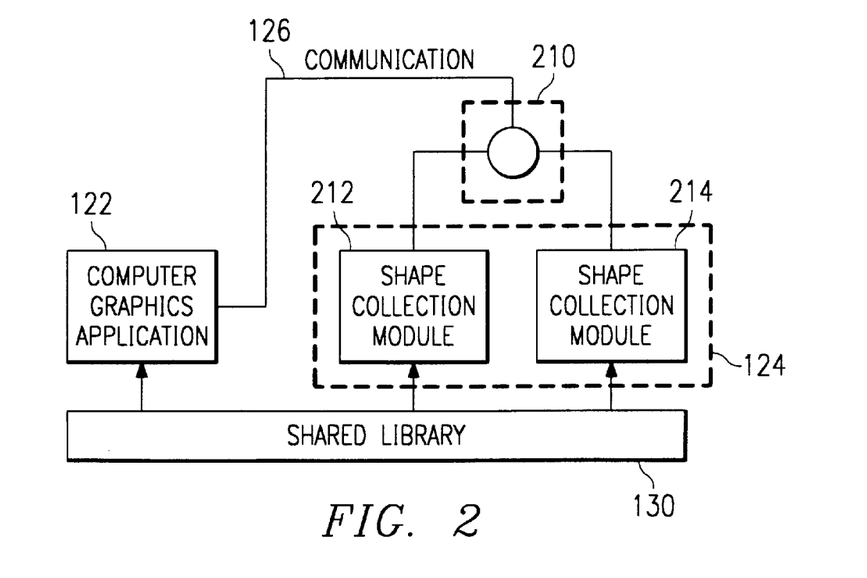
FIG. 2 illustrates in more detail the software architecture of the computer graphics system.

FIG. 2 shows a schematic of memory 118 in block diagram form, further illustrating computer graphics application 122, shape library 124, communication link 126, and shared library 130 shown in FIG. 1. The computer graphics application 122 is a shape manipulator that, as discussed in greater detail below, is operable to access generic capabilities associated with an external shape and delegate the production of a graphical image of the external shape to the capabilities associated with the shape. The production of a graphical image may comprise, for example, generating data that may be used by the computer graphics application 122 to place a graphical image on an output device, generating data and placing a graphical image on an output device, writing a representation of a graphical image to memory, or the generation of other forms of representations of graphical images. Capabilities are action methods, symbol methods, or any other functions that allow the generation of information required to produce a graphical image. Exemplary action methods and symbol methods are discussed below. The ability to place the capabilities of a shape outside computer graphics application 122 provides several technical advantages. For example, shapes not contemplated at the time of creation of computer graphics application 122 may be subsequently added to computer graphics system 120 without modifying computer graphics application 122. Additionally, shapes may be developed by third parties, addressing particular markets. Furthermore, because shapes may be developed external to the computer graphics application 122, they may be developed outside the application project schedule. In addition, the invention provides for the modular production of additional shapes. Shapes may be grouped in different modules based on similarity of appearance or other characteristics, such as intended use. For example, shapes commonly used in a particular technical field may be grouped in one module. The invention also provides an architecture that allows for the integration of additional shapes with an existing computer program without modifying that existing program.

The shape library 124 comprises a plurality of shape collection modules 212 and 214. In a particular embodiment, shape collection modules 212 and 214 comprise a dynamic link library (DLL) that allows executable routines to be stored separately as files with DLL extensions and to be loaded only when needed by the program that calls them. In that embodiment, shape collection DLLs 212 and 214 are self-registering DLLs, which means they comprise two functions to register and unregister themselves through a system registry database for recognition by the computer graphics application 122. However, the present invention contemplates any suitable software architecture using dynamic link libraries, plug-ins, extensions, initialization files, or other modular arrangement that allows shape collection modules 212 and 214 to be stored external to computer graphics application 122.

Shape collection modules 212 and 214 may be loaded into memory 118 from disk drives 120 when needed by computer graphics application 122. In one embodiment, shape collection modules 212 and 214 are loaded into memory 118 when computer graphics application 122 is executed. Because shape collection modules 212 and 214 are separate from computer graphics application 122, additions or improvements may be made to shape collection modules 212 and 214 without affecting the operation of computer graphics application 122. Although two shape collection modules 212 and 214 are explicitly shown, the computer graphics application 122 supports any number of shape collection modules. Shape collection library 124 may comprise, for example, shape collection modules delivered with computer graphics application 122, shape collection modules subsequently provided, and shape collection modules developed by third parties. Shape collection modules in shape library 124 may be organized in a variety of formats, including a flat structure or a hierarchial arrangement. In a hierarchial arrangement, related shape collection modules may contain sub-modules. The criteria for grouping shape collection modules and sub-modules may comprise appearance, field of application, or other suitable criteria for arranging collections of shapes. For example, shape collection module 212 may contain various forms of arrow shapes, and shape collection module 214 may contain various shapes related to digital electronic circuits.

The shared library 130 may also be a DLL. However, the present invention contemplates any suitable software architecture using dynamic link libraries, plug-ins, extensions, initialization files, or other modular arrangement that allows utility functions to be stored externally to computer graphics application 122 and shape library 124. Shared library 130 may be loaded into memory 118 from disk drives 120 when needed by computer graphics application 122. Shared library 130 provides a group of utility functions that may be used by either computer graphics system 110 or shape library 124. Examples of these utility functions include, for example, drawing small markers on a computer screen, such as on output device 116, or drawing a gradient blend.

The communication link 126 allows communication between computer graphics application 122 and shape library 124. Communication link 126 may comprise, for example, the component object model 210 used by the Object Linking and Embedding (OLE) technology developed by Microsoft. Communication link 126 may also comprise a simple dynamic link library application program interface, pipes, shared memories, or sockets as used in a UNIX operating environment as well as other emerging object-oriented technologies, such as OpenDoc, Nextstep, and CORBA. Communication link 126 allows communication of complex objects between external modules 212 and 214 and computer graphics application 122 without requiring knowledge of the contents of the external modules 212 and 214.

Figure 3A:
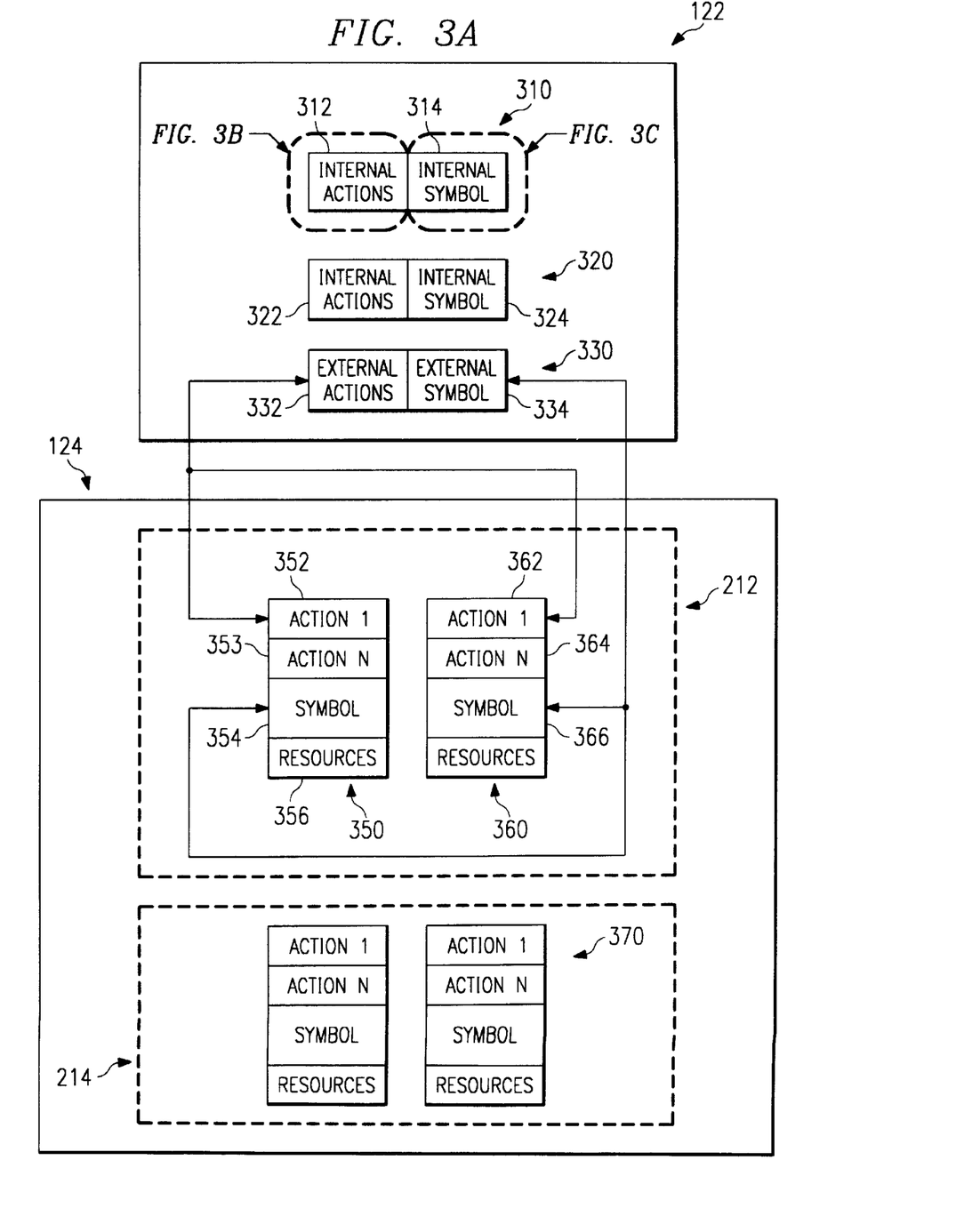
FIG. 3A illustrates the interaction between a graphics application and shape library.
Figure 3B:
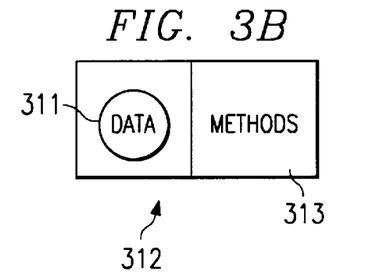
FIG. 3B illustrates details of an internal action shown in FIG. 3A.

FIG. 3A shows a schematic of computer graphics application 122 and its interaction with shape library 124 in block diagram form, further illustrating details of computer graphics application 122. The computer graphics application 122 comprises a plurality of internal shapes 310 and 320 and one external shape 330. Internal shapes 310 and 320 each comprise information used by computer graphics application 122 to produce a different graphical image on output device 116. These images may comprise, for example, a circle or a rectangle. External shape template 330 comprises pointers to shapes contained within shape library 124, which are used by computer graphics application 122 to produce graphical images that are not supported by internal shapes 310 or 320.

Each internal shape 310, 320 comprises a set of internal actions 312 and an internal symbol 314. Internal actions 312 comprise a set of internal action methods 313 and a set of internal action data 311, shown in FIG. 3B. Internal action methods 313 are functions that operate on internal action data 311 to generate an internal action 312. An internal action 312 allows computer graphics application 122 to pass user interaction from input device 114, such as mouse and keyboard inputs, to internal symbol methods 317, which in turn generate information used by computer graphics application 122 to create, edit, render, modify, read, or write a graphical object. Examples of internal actions 312 comprise the create action and edit actions. The create action creates a representation of graphical image, for example a rectangle, that the computer graphics application 122 places on an output device. An edit action allows editing a graphical image. Both the create action and the edit action may comprise clicking on an external shape button or a menu item on a graphical user interface.

Figure 3C:
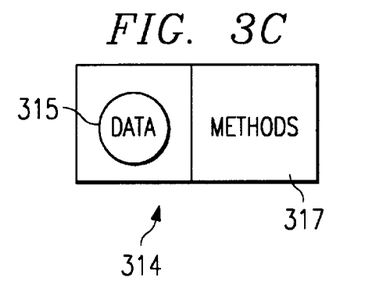
FIG. 3C illustrates details of an internal symbol shown in FIG. 3A.

Internal symbol 314 comprises a set of internal symbol methods 317 and a set of internal symbol data 315, as shown in FIG. 3C. The internal symbol methods 317 are functions that operate on internal symbol data 315 to generate information used by computer graphics application 122 to create, edit, render, modify, read, or write a graphical object on output device 116. For example, internal symbol methods 317 may rotate a representation of a rectangle and the computer graphics application 122 may place a rotated rectangle on a computer screen based on the representation of the rotated rectangle produced by the internal symbol methods 317.

FIG. 3A also illustrates shape library 124. The shape library 124 comprises a plurality of shape collection modules 212 and 214. Each shape collection module 212, 214 comprises a plurality of external shapes, such as external shapes 350, 360, and 370. Shape collection modules 212 and 214 may be organized such that similar shapes are contained within the same shape collection module. External shape 350 comprises a plurality of external actions 352, 353, an external symbol 354, and external resources 356. External resources 356 provide additional information used by computer graphics application 122 to generate graphical images, for example, information related to bit mapped images.

The external shape template 330 does not comprise a predetermined set of actions and a symbol. Rather, in response to information from device 114, external shape template 330 accesses an external shape contained within shape library 124, such as external shape 350 or 360, to utilize the capabilities of the external shape. The external shape template 330 comprises an external action template 332 and an external symbol template 334. The external action template 332 accesses an external action, such as external actions 352 and 362, and the external symbol template 334 accesses an external symbol, such as external symbols 354 and 366.

In FIG. 3A, external shape template 330 is associated with two shapes 350 and 360 in shape library 124. For shape 350, external action template 332 points to external action 352 and external symbol template 334 points to external symbol 354. For shape 360, external action template 332 points to external action 362 and external symbol template 334 points to external symbol 366. In FIG. 3A, shape template 330 does not point to shape 370. Pointing to shapes 350 and 360 and not pointing to shape 370 by external shape template 330 corresponds to the condition of displaying two external shapes 350 and 360 contained within shape library 124 on output device 116 and not displaying a third external shape 370.

Figure 4:
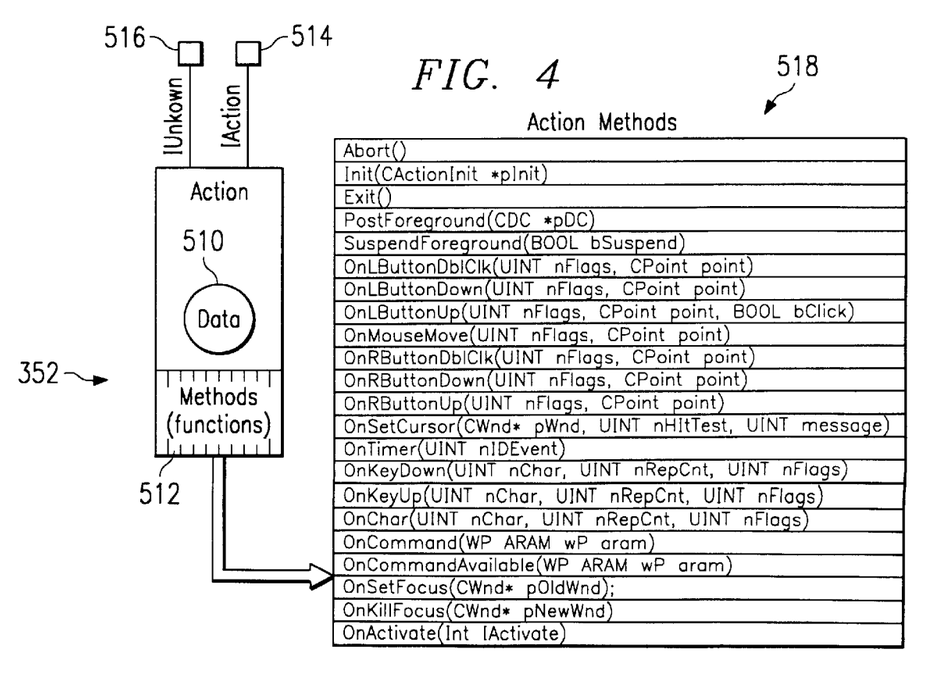
FIG. 4 shows a schematic of the external action associated with the external shape shown in FIG. 3A.

FIG. 4 shows a schematic of an external action 352 associated with external shape 350. External action 352 comprises external action data 510 and external action methods 512. External action methods 512 are functions that work together to operate on external action data 510 to create an external action. An external action, such as external action 352, allows computer graphics application 122 to pass user interaction from input device 114, such as mouse and keyboard inputs, to external symbol methods 612, which as discussed below are functions that operate to create, edit, render, modify, read, or write a graphical object on output device 116. Examples of external action 364 comprise the create action and edit actions. The create action creates a graphical image, for example a star. An edit action allows editing a graphical image, for example editing a star. A user may invoke the create star external action, for example, by clicking on a star button in a graphical user interface. The star button may provide a menu with a variety of types of stars.

External action methods 512 comprise generic action methods 518. Generic action methods 518 comprise generic functions that are operable in combination to receive user interaction received by the computer graphics application 122 from input device 114 for manipulation of shapes that are not contained within computer graphics application 122 and that comprise a configuration unknown to computer graphics application 122. The generic action methods 518 are defined generically in such a way that they may be applied to any type of shape. Unlike conventional systems, they are not specific to any one shape. The computer graphics application 122 is written to be operable to access the generic access methods 518 and the generic action methods 518 are exhaustive such that any action that may be associated with any shape can be represented by the generic access methods 518. Thus, the generic action methods 518 are generic enough to allow for the subsequent creation of new actions through the use of generic action methods 518. The use of generic action methods 518 and, as discussed below, generic symbol methods 618 allows external shapes to be used by computer graphics application 122.

One of the generic action methods 518 comprises an initialization method, CActionInit method. The CActionInit method allows an external shape to communicate with the computer graphics application 122. After execution of an external action, data or events are communicated by the external action through a callback function provided in the initialization of the action. The callback function is provided in the initialization of an action by a pointer within the CActionInit method. Data transfers that may be communicated by an external shape to the computer graphics application 122 through the use of a callback function provided in the initialization of an action comprise the transfer of an external symbol to the computer graphics application for insertion into a current drawing, querying a disk path to a CD-ROM for retrieving a file from the CD-ROM, passing data for "undoing" an operation, retrieving the area of a current page selection, or other types of data transfers. Events that may be communicated by an external shape to the computer graphics application 122 through the use of a callback function provided in the initialization of an action comprise notifying the application to display or not to display selection markers, notifying the computer graphics application 122 that the external symbol has been changed, invalidating the area of the external symbol for reprinting, or other events that may need to be communicated to the computer graphics application by an external action.

External action 352 is a queryable interface. A queryable interface may receive requests for communication in different formats. External action 352 supports an IAction interface format 514 and an IUknown interface format 516. The IAction interface format 514 is defined by generic action methods 518 and provides a format for communication with computer graphics application 122. The IUknown interface format 516 is a default interface format used in many applications and allows the computer graphics application 122 to access the IAction interface format 514. External actions associated with other external shapes are substantially similar to external action 352 associated with external shape 350.

Figure 5:
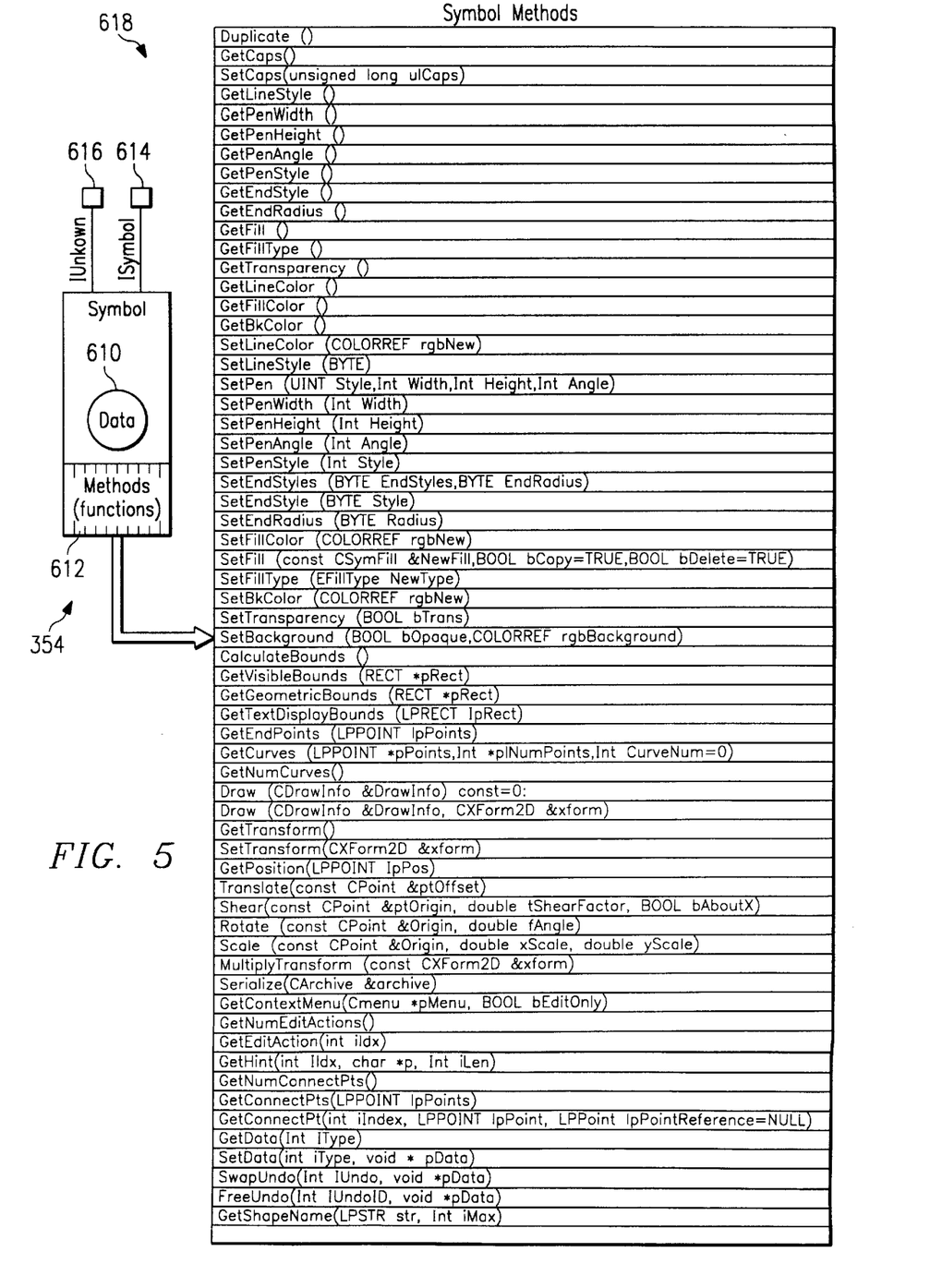
FIG. 5 shows a schematic of the external symbol associated with the external shape shown in FIG. 3A.

FIG. 5 shows a schematic of an external symbol 354 associated with external shape 350. External symbol 354 comprises external symbol data 610 and external symbol methods 612. External symbol methods 612 are functions that operate on external symbol data 610 to create, edit, render, modify, read, or write a graphical object.

External symbol methods 612 comprise generic symbol methods 618. Generic symbol methods 618 are generic functions that allow manipulation of a graphical image of unknown configuration. The generic symbol methods are defined generically in such a way that they may be applied to any type of shape. Unlike conventional systems, they are not specific to any one shape. The generic symbol methods 618 are generic enough to allow for the subsequent creation of new symbols through use of generic symbol methods 618. The generic symbol methods 618 are also exhaustive such that any symbol or manipulation of any symbol can be represented by generic symbol methods 618. Because, computer graphics application 122 is operable to receive and utilize generic symbol methods 618, use of generic symbol methods 618 allows external shapes to be used by computer graphics application 122. Thus, the use of generic external symbol methods, such as generic external symbol methods 618, allows manipulation of graphical images that are not contained within computer graphics application 122 and that comprise a configuration unknown to computer graphics application 122.

External symbol 354 is also a queryable interface. External symbol 354 supports an ISymbol interface format 614 and an IUknown interface format 616. The ISymbol interface format 614 is defined by symbol methods 618 and provides a format for communication with computer graphics application 122. The IUknown interface format 616 is a default interface format used in many applications and allows the computer graphics application 122 to access the ISymbol interface format 614.

Figure 6:
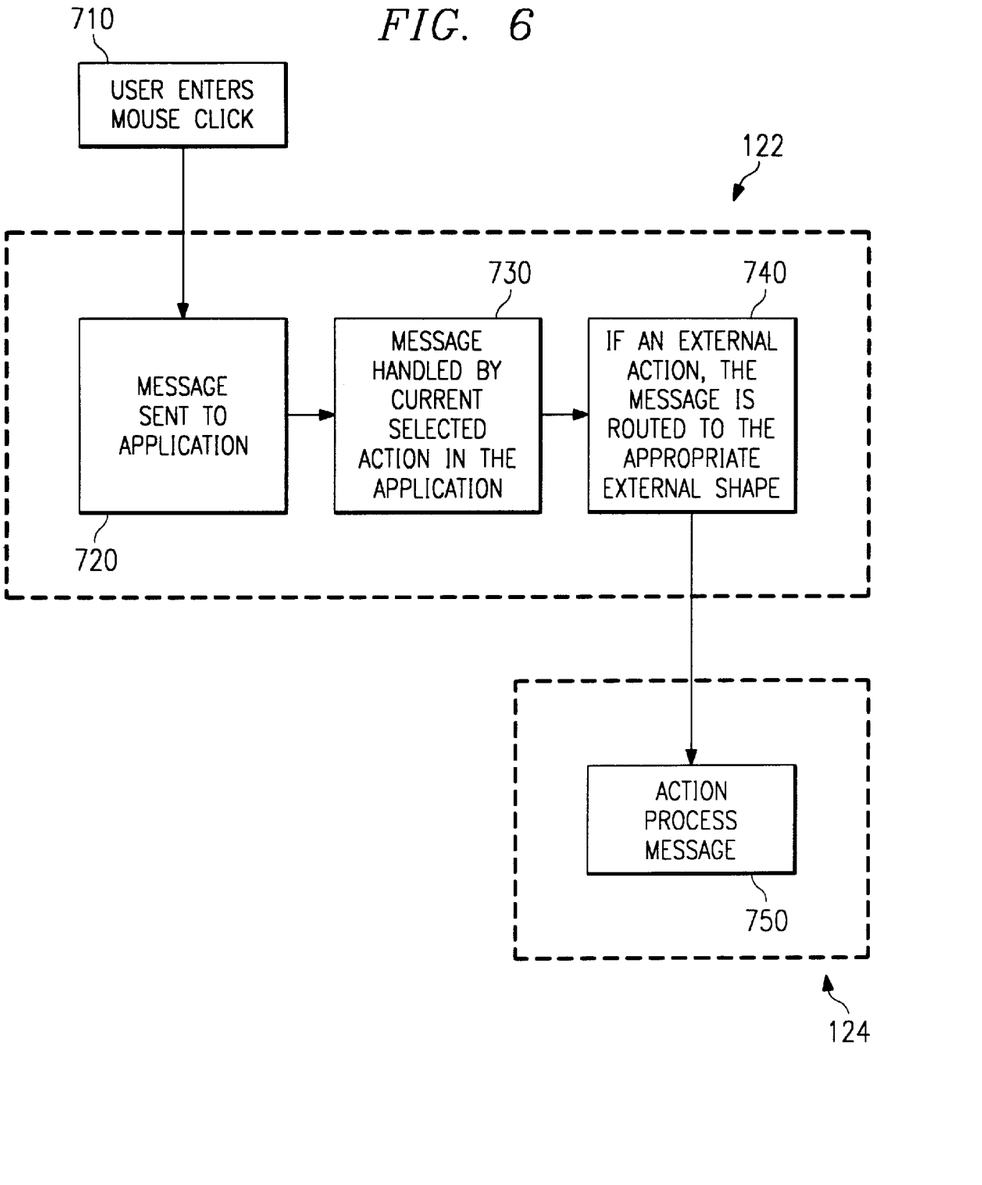
FIG. 6 is an example flow chart of an example external action.

FIG. 6 is an example flow chart of an example external action, such as external action 352. At step 710 a user may enter a mouse click to provide a message that a desired action take place. For example, the user may click on a button in a graphical user interface to provide a message to computer graphics application 122 to create a star. At step 720 computer graphics application 122 receives the mouse click. Because the message requests an external action, at step 730 the external action template 332 is selected to handle the request. At step 740, external action template 332 routes the message to the appropriate external action associated with the desired star shape, such as action 352, in shape library 124. Steps 720, 730, and 740 are performed by computer graphics application 122 within computer graphics application 122. At step 750, the message for the requested action is received within shape library 124 and the external action is executed by the methods associated with the requested action in order to produce a star. External symbols, such as external symbol 354, are accessed by computer graphics application 122 in substantially the same way as external actions are accessed.

Referring now to FIGS. 1 through 6 of the drawings, the operation of one embodiment of the invention will be described. If a user desires to create an arrow on a computer screen, he makes an appropriate demand through input device 114. Such a demand may comprise, for example, clicking on a button in a graphical user interface with a mouse on a particular area of a computer screen to select a menu item. In response to a request from input device 114, computer graphics application 122 determines whether the desired graphical image is an external shape or an internal shape. If it is an external shape, external shape template 330 accesses external actions and an external symbol from a shape in shape library 124 that is associated with the desired external shape. The execution of the external actions and the external symbol may draw an arrow on output device 116. Because the external actions comprise generic action methods 518 and the external symbol comprises generic symbol methods 618, the computer graphics application 122, which is operable to access and use generic action methods 518 and generic symbol methods 618, is able to produce a graphic image based on an external shape, even if the external shape was produced subsequent to the generation of computer graphics application 122.

Therefore, the invention provides a system for the production of graphical images that allows shapes to be stored outside the computer program using the shapes. New shapes may be added to the system without incurring the disadvantages associated with revising the computer program. Furthermore, because the invention provides a program operable to receive a robust set of generic action methods 518 and a robust set of generic symbol methods 618 from external shapes in shape library 124, the invention allows for the addition of shapes with capabilities not contemplated at the time the computer program was written. Thus, unlike conventional systems, the invention is not limited to utilizing external shapes that have predetermined capabilities.

Although the invention has been particularly shown and described by the foregoing detailed description, it will be understood by those skilled in the art that various other changes in form and detail may be made without departing from the spirit and scope of the invention.

What is claimed is:

1. A computerized system comprising:
   a storage medium;
   a processor coupled to the storage medium;
   a computer program stored in the storage medium, the computer program operable to run on the processor, the computer program further operable to:
   access an external shape stored outside the computer program, the external shape comprising external capabilities; and
   delegate the production of a graphical image of the external shape to the external capabilities.

2. The computerized system of claim 1, wherein the computer program is further operable to:
   access an external shape stored outside the computer program, the external shape comprising an external action and an external symbol; and
   delegate the production of graphical image of the external shape to the external action and the external symbol.

3. The computerized system of claim 2, wherein the computer program is further operable to:
   receive user input in a manner defined by the external action; and
   manipulate the graphical image in response to the user input in a manner defined by the external symbol.

4. The computerized system of claim 2 wherein the external action comprises a plurality of external methods and external data.

5. The computerized system of claim 4 wherein the plurality of external methods comprises:

a first method responsive to a mouse button activation;

a second method responsive to a mouse movement;

a third method responsive to input from a keyboard; and a fourth method responsive to a command received from the computer program based on input received from a user.

6. The computerized system of claim 2 wherein the external symbol comprises a plurality of external methods and external data.

7. The computerized system of claim 6 wherein the plurality of external methods comprises:

a first external method operable to set the attributes of the external symbol;

a second external method operable to calculate the bounds of the external symbol;

a third external method operable to get the attributes of the external symbol;

a fourth external method operable to render the external symbol; and a fifth external method operable to archive the external symbol.

8. A computer program encoded on a computer-readable medium, the computer program operable to:

access an external shape stored outside the computer program, the external shape comprising external capabilities; and delegate the production of a graphical image of the external shape to the external capabilities.

9. The computer program of claim 8, wherein the computer program is further operable to:

access an external shape stored outside the computer program, the external shape comprising an external action and an external symbol; and delegate the production of a graphical image of the external shape to the external action and the external symbol.

10. The computer program of claim 9, wherein the computer program is further operable to:

receive user input in a manner defined by the external action; and manipulate the graphical image in response to the user input in a manner defined by the external symbol.

11. The computer program of claim 9, wherein the external action comprises a plurality of external methods and external data.

12. The computerized system of claim 11 wherein the plurality of external methods comprises:

a first method responsive to a mouse button activation;

a second method responsive to a mouse button activation; and a third method operable to allow the external shape to communicate data and events to the computer program.

13. The computer program of claim 9 wherein the external symbol comprises a plurality of external methods and external data.

14. The computerized system of claim 13 wherein the plurality of external methods comprises:

a first external method operable get the attributes of the external symbol;

a second external method operable to calculate the bounds of the external symbol;

a third external method operable to transform the external symbol;

a fourth external method operable to render the external symbol; and a fifth external method operable to archive the external symbol.

15. The computer program of claim 8 wherein the external capabilities comprise a plurality of external methods and external data.

16. A method for producing graphical images comprising:

executing a computer program;

providing a shape library external to the computer program, the shape library having at least one shape, the at least one shape having capabilities;

providing the capabilities associated with the at least one shape to the computer program while the application is executing; and generating a graphical image based on the capabilities.

17. The method of claim 16 wherein the step of providing a shape library comprises providing a dynamic link library.

18. The method of claim 16 wherein the step of providing the capabilities associated with the shape comprises providing a plurality of actions comprising a plurality of action methods and providing a symbol comprising a plurality of symbol methods.

19. The method of claim 18 wherein the plurality of action methods comprises:

a first method responsive to a mouse button activation;

a second method responsive to a mouse movement;

a third method responsive to input from a keyboard; and a fourth method responsive to a command received from the computer program based on input received from a user.

20. The computerized system of claim 18 wherein the plurality of symbol methods comprises:

a first external method operable get the attributes of the symbol;

a second external method operable to calculate the bounds of the symbol;

a third external method operable to transform the symbol;

a fourth external method operable to render the symbol; and a fifth external method operable to archive the symbol.

21. A computer graphics program encoded on a computer readable medium for generating a graphical image, comprising:

an external shape module having an external shape that defines an external action and an external symbol, the external action operable to perform a generic action method and the external symbol operable to perform a generic symbol method;

a communication link coupled to the external shape module; and a computer graphics application coupled to the communication link and operable to communicate with the external shape module using the communication link, the computer graphics application comprising an external action template operable to access the external action and an external symbol template operable to access the external symbol, the computer graphics application further operable to delegate the production of a graphical image to the generic action method and the generic symbol method.

22. The computer graphics program of claim 21, further comprising an internal shape defining an internal action and an internal symbol.

23. The computer graphics program of claim 21, wherein the external symbol is operable to perform a plurality of generic symbol methods.

24. The computer graphics program of claim 21, wherein the external shape module comprises a dynamic link library.

25. The computer graphics program of claim 21, further comprising a shared library and wherein the computer graphics application is further operable to access the shared library and the external shape library is operable to access the shared library.

26. The computer graphics program of claim 21, wherein the communication link is operable to allow communication between the external shape library and the computer graphics application without the computer graphics application requiring knowledge of the contents of the external shape library.

27. The computer graphics program of claim 21, wherein the communication link comprises the Object Linking and Embedding technology developed by Microsoft.

28. The computer graphics program of claim 21, wherein the communication link comprises a dynamic link library application program interface.

\* \* \* \* \*